United States Patent
Wang

(10) Patent No.: US 8,225,056 B2
(45) Date of Patent: *Jul. 17, 2012

(54) METHOD FOR PROTECTING DATA AND METHOD FOR MANAGING ACCESS AUTHORITY

(75) Inventor: Chin-Yu Wang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 979 days.

This patent is subject to a terminal disclaimer.

(21) Appl. No.: 12/198,120

(22) Filed: Aug. 26, 2008

(65) Prior Publication Data

US 2009/0106514 A1    Apr. 23, 2009

(30) Foreign Application Priority Data

Oct. 19, 2007 (TW) .............................. 96139326 A

(51) Int. Cl.
*G06F 12/08* (2006.01)

(52) U.S. Cl. ................. 711/162; 711/163; 711/E12.091
(58) Field of Classification Search .................. None
See application file for complete search history.

(56) References Cited

U.S. PATENT DOCUMENTS

| 4,951,249 A * | 8/1990 | McClung et al. ............... 726/35 |
| 5,809,230 A * | 9/1998 | Pereira .......................... 726/35 |
| 6,507,905 B1 * | 1/2003 | Hubacher et al. .............. 713/1 |
| 7,111,203 B2 | 9/2006 | Hu et al. |
| 2007/0220227 A1 * | 9/2007 | Long ........................... 711/165 |

FOREIGN PATENT DOCUMENTS

| CN | 1517888 | 8/2004 |
| TW | 454145 | 9/2001 |
| TW | 200639703 | 11/2006 |

* cited by examiner

*Primary Examiner* — Kevin Ellis
*Assistant Examiner* — Eric Loonan
(74) *Attorney, Agent, or Firm* — Jianq Chyun IP Office

(57) ABSTRACT

A method for protecting data, adapted for a computer system, is provided. The computer system includes a storage device. The method includes: when the computer system executes a power-off procedure, inspecting whether a preset external storage device is connected to the computer system; if it is determined that the preset external storage device is connected to the computer system, when the computer system executes the power-off procedure, backing up data of a predetermined segment of the storage device to the preset external storage device, and generating a back-up data, and then writing a specific data template to the predetermined segment for covering original data of the predetermined segment.

16 Claims, 6 Drawing Sheets

METHOD FOR PROTECTING DATA AND METHOD FOR MANAGING ACCESS AUTHORITY

CROSS-REFERENCE TO RELATED APPLICATION

This application claims the priority benefit of Taiwan application serial no. 96139326, filed on Oct. 19, 2007. The entirety of the above-mentioned patent application is hereby incorporated by reference herein and made a part of this specification.

BACKGROUND OF THE INVENTION

1. Field of the Invention

The present invention generally relates to a method for protecting data, and more particularly, to method for protecting data and a method for managing an access authority for a storage device containing the data.

2. Description of Related Art

Science and technology are being fast developed, and computer systems have also become important tools for people's daily life. Correspondingly, many storage devices have been developed for storing data for the computer systems. Typically, a user often store important data, such as personal information, meeting reports, and company confidential documents, in a storage device. However, when such a storage device is unfortunately lost, the important data contained therein may probably be leaked out.

For the purpose of avoiding information leakage caused by the foregoing situation, there are storage devices having password protection function developed and being selling in the market. Such a storage device typically has a controller adapted for locking and unlocking the storage device according to instructions issued by a basic input output system (BIOS) thereof. Although, it is conventional to use a password to protect the data contained in a computer system, such kind of protection is not as safe as desired. Typically, the password for data protected by and stored in the storage device supporting password protection function is stored in a circuit board of the storage device. Therefore, in some cases, one may access the data stored in the storage device by disassemble the storage device from the computer system, and then replacing the circuit board having the password stored therein of the storage device with a same type circuit board, and then reinstalling the storage device back to the computer system.

As such, it is desired to provide better protection for the data stored in data storage devices.

SUMMARY OF THE INVENTION

Accordingly, the present invention is directed to provide a method for protecting data, adapted for providing protection for data stored in a storage device equipped to a computer system, when the computer system executes a power-off procedure.

The present invention is further directed to provide method for protecting data, adapted for providing protection for data stored in a storage device equipped to a computer system, when an operation system of the computer system is in a sleeping status, power saving status, or user logging out status.

The present invention is further directed to provide a method for managing an access authority of a storage device. The method is adapted for providing protection for data stored in the storage device which is equipped to a computer system, when the computer system executes a power-off procedure or an operation system of the computer system is in a sleeping status, power saving status, or user logging out status.

The present invention provides a method for protecting data, adapted for a computer system. The computer system includes a storage device. The method includes: when the computer system executes a power-off procedure, inspecting whether a preset external storage device is connected to the computer system; if it is determined that the preset external storage device is connected to the computer system, when the computer system executes the power-off procedure, backing up data of a predetermined segment of the storage device to the preset external storage device, and generating a back-up data, and then writing a specific data template to the predetermined segment for covering original data of the predetermined segment.

Viewing from another point, the present invention provides a method for protecting data, adapted for a computer system, the computer system including a storage device. The method includes steps of: when the computer system is operated in an unusual operation status, inspecting whether a preset external storage device is connected to the computer system; if it is determined that the preset external storage device is connected to the computer system, while the computer system is operated in a usual operation status, backing up data of a predetermined segment of the storage device to the preset external storage device, and generating a back-up data, and then writing a specific data template to the predetermined segment for covering original data of the predetermined segment.

Viewing from another point, the present invention further provides a method for managing an access authority for a storage device, adapted for managing a computer system including a plurality of storage devices. The method includes steps of: when the computer system is either being executed with a power-off procedure, or being operated in an unusual operation status, inspecting whether a preset external storage device is connected to the computer system; if it is determined that the preset external storage device is connected to the computer system, while the computer system is either being executed with the power-off procedure, or being operated in the unusual operation status, backing up data of a predetermined segment of at least one storage device selected from the storage devices to the preset external storage device, and generating a back-up data, and then writing a specific data template to the predetermined segment for covering original data of the predetermined segment, so that the data stored in the selected storage device cannot be accessed without being authorized.

The present invention employs a preset external storage device for backing up data of a predetermined segment of a storage device, and further employs a specific data template for covering original data of the foregoing predetermined segment, so as to provide protection to the data stored in the storage device. Before recovering data of the predetermined segment back to the original data, the data stored in the predetermined segment is still the specific data template, so that the computer system is incapable of normally accessing the data stored in the predetermined segment of the storage device. As such, the present invention is adapted for effectively protecting data stored in the storage device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
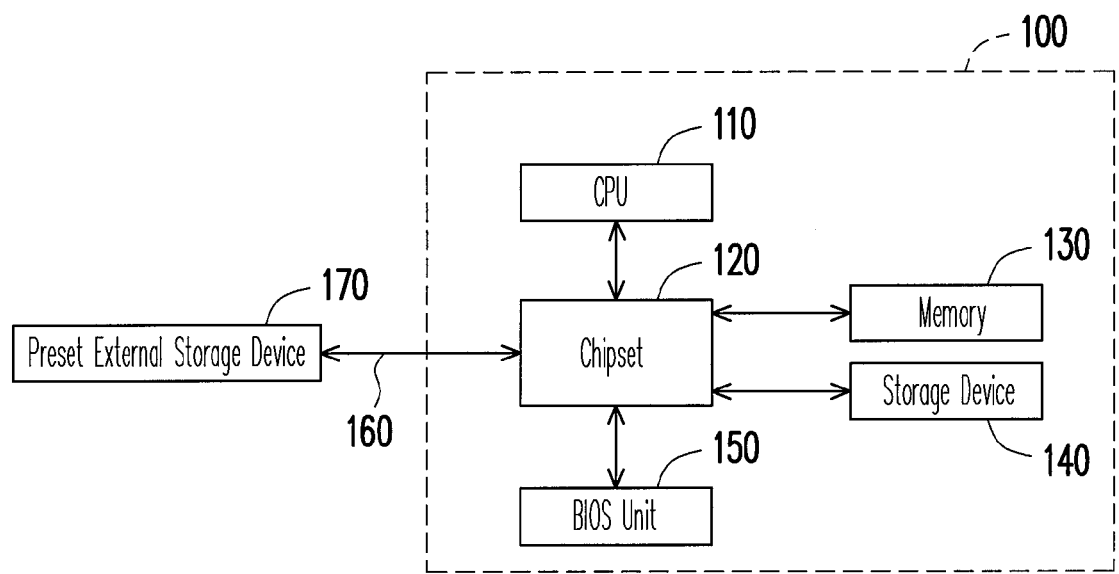
FIG. 1 is a block diagram illustrating a system structure of a computer system according to an embodiment of the present invention.

Reference will now be made in detail to the present preferred embodiments of the invention, examples of which are illustrated in the accompanying drawings. Wherever possible, the same reference counting numbers are used in the drawings and the description to refer to the same or like parts.

FIG. 1 is a block diagram illustrating a system structure of a computer system according to an embodiment of the present invention. Referring to FIG. 1, it shows a computer system 100. The computer system 100 includes a central processing unit (CPU) 110, a chipset 120, a memory 130, a storage device 140, and a basic input output system (BIOS) unit 150. The CPU 110 is coupled to the chipset 120. Generally, the chipset 120 includes a north bridge chip and a south bridge chip. The CPU 110 is coupled to the memory 130, the storage device 140, and the BIOS unit 150, via the chipset 120.

In the current embodiment, the memory 130 can be a dynamic random access memory (DRAM), a static random access memory (SRAM), a synchronous dynamic random access memory (SDRAM), or a double data random access memory (DDRAM). Further, the storage device 140 for example is a hard drive, while in other embodiment of the present invention the storage device 140 can also be a flash memory. The BIOS unit 150 for example can be a flash memory or a read only memory (ROM) containing BIOS codes therein.

Further, in addition to the built-in storage device 140, the computer system 100 may be further connected with a preset external storage device 170 via a connecting interface 160. The connecting interface 160 can be a universal serial bus (USB) interface, an IEEE 1394 interface, a serial advanced technology attachment (SATA) interface, or an integrated drive electronics (IDE) interface. The preset external storage device 170 can be a non-volatile storage device having a corresponding connecting interface, for example a USB drive.

Further, the computer system 100 of the embodiment is adapted for providing protection for data stored in the storage device 140. The procedure of protecting data stored in the storage device 140 is going to be discussed in details below while further referring to a flow chart.

Figure 2A:
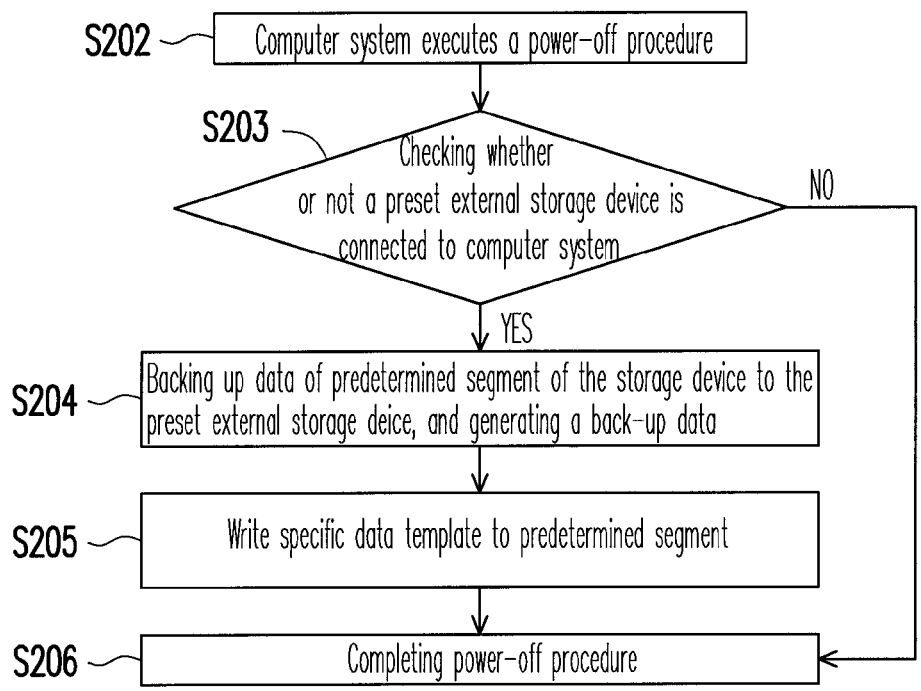
FIGS. 2A and 2B illustrate a flow chart illustrating a method for protecting data according to an embodiment of the present invention.
Figure 2B:
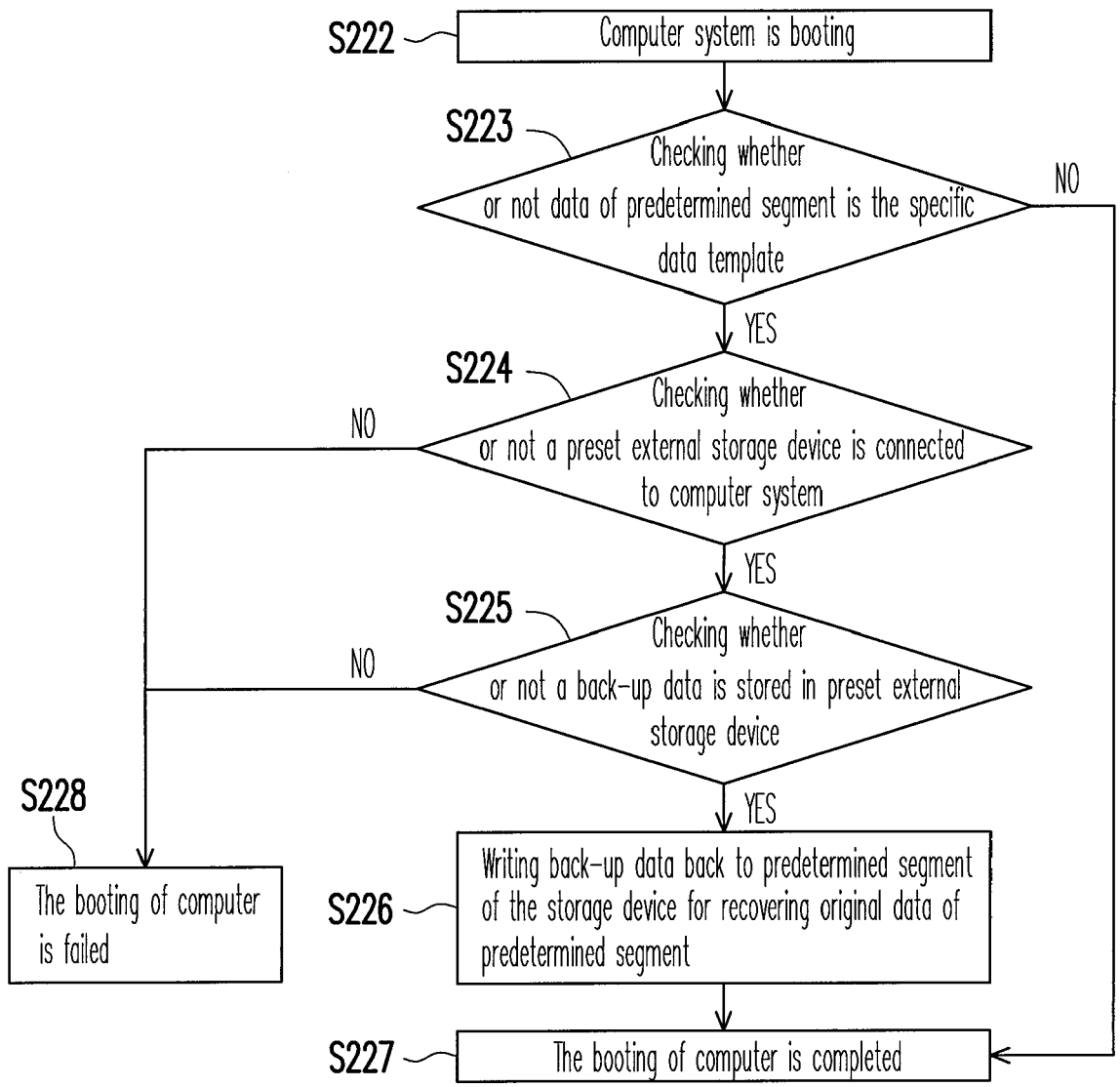

FIGS. 2A and 2B illustrate a flow chart illustrating a method for protecting data according to an embodiment of the present invention. The method for protecting data is adapted for the computer system 100 of FIG. 1. Referring to FIGS. 1 and 2A, the method for protecting data can be complied with the BIOS program stored in the BIOS unit 150 of the computer system 100. When a user enables the method for protecting data in a BIOS setting menu, the computer system 100 starts from steps S202, entering a power off procedure. The BIOS setting menu indicates a setting menu which can be entered by pressing a predetermined key (e.g., F8 key), when the computer system 100 is turned on and before entering the operation system.

When the computer system 100 enters the boot procedure, the CPU 110 of the computer system 100 executes the codes stored in the BIOS unit 150, for checking whether or not the preset external storage device 170 is connected with the computer system (step S203). In some embodiments, the computer system 100 may inspect whether the preset external storage device 170 is connected with the computer system or not by inspecting a status of a preset flag. The preset flag for example can be set in a register of the CPU 110 or in the memory 130 (not shown).

For example, when the status of the preset flag is 1, that indicates that the preset external storage device 170 is connected to the computer system 100 (a result "YES" of step S203).

At step S204, the computer system 100 backs up data of a predetermined segment of the storage device 140 to the preset external storage device 170, thus generating a corresponding back-up data. In the current embodiment, the storage device 140 for example is a hard drive. Therefore, the foregoing predetermined segment of data can be a data of a master boot recorder (MBR SECTOR).

Further when the status of the preset flag is 0, that indicates that the preset external storage device 170 is not connected to the computer system 100 (a result "NO" of step S203), then the computer system 100 directly completes the boot procedure (step S206).

Further, at step S205, the BIOS codes executed by the computer system 100 control corresponding components of the computer system 100 (e.g., the CPU 110 and the chipset 120) to write a specific data template to the predetermined segment of the storage device 140, and overwrite original data originally stored in the predetermined segment, for protecting data. In the current embodiment, the specific data template for example can be a specific word series, or an encoded word series which can be self-inspected.

After executing step S205, the computer system 100 continuously executes the rest steps of the power-off procedure, until the computer is powered off (step S206).

In the current embodiment, the storage device 140 is a hard drive. Generally, data in a MBR SECTOR of a hard drive includes starting position and ending position of each partition sector of the hard drive. If the data in the MBR SECTOR of the hard drive is destroyed, the data stored in the hard drive cannot be accessed. Further, in the current embodiment, the preset storage device 170 for example is a USB drive. As such, by complying with the method for protecting data according to the present invention, a user can take off the preset external storage device 170 to carry with him, so as to prohibit unauthorized individuals from accessing data stored in the storage device.

Then, when the user want to use the computer system 100 again, he is allowed to complete the boot procedure assisted by the preset external storage device 170 containing the original data of the predetermined segment of the storage device 140. Details may be learnt by referring to the illustration below.

Referring to FIGS. 1 and 2B together, when a user restarts the computer system 100, at step S222, the computer system 100 enters a boot procedure. During the boot procedure, the codes of the BIOS unit will be executed for checking whether or not the data in the predetermined segment of the storage device 140 is the specific template (step S223).

If the codes of the BIOS unit 150 inspect that the data in the predetermined segment of the storage device 140 is not the specific data template (a result "NO" of step S223), the computer system 100 normally executes the boot procedure for booting (step S227).

Or otherwise, if the codes of the BIOS unit 150 check that the data in the predetermined segment of the storage device 140 is the specific template (a result "YES" of step S223), the computer system 100 executes step S224. At step S224, the codes of the BIOS unit 150 check whether or not the preset external storage device 170 is connected to the computer system 100.

Because the data of the MBR sector of the storage device 140 has been overwritten by the specific data template, if the codes of the BIOS unit 150 inspect that the preset external storage device 170 is not connected to the computer system 100 (a result "NO" of step S224), the computer system 100 executes step S228, to terminate the power-on procedure. That means the computer system 100 cannot boot with the original data of the MBR sector of the storage device 140 in this case.

In other words, if the codes of the BIOS unit 150 inspect that the preset external storage device 170 is connected to the computer system 100 (a result "YES" of step S224), the computer system 100 executes step S225.

At step S225, the BIOS codes executed by the computer system 100 control corresponding components (e.g., the CPU 110 and the chipset 120) to check whether or not the back-up data of the MBR sector of the storage device 140 is stored in the preset storage device 170.

If the preset external storage device 170 does not contain the back-up data (a result "NO" of step S225), the computer system executes step S228.

If the preset external storage device 170 contains the back-up data (a result "YES" of step S225), the computer system further executes step S226.

At step S226, the computer system 100 writes the back-up data stored in the preset external storage device 170 back to the predetermined segments of the storage device 140 via the connecting interface 160 and the chipset 120, for recovering the original data of the predetermined segment, so as to allow the storage device to be normally accessed as usual. Then, the computer system 100 continues to execute the boot procedure booting (step S227).

The foregoing embodiment exemplifies the protection provided to the data stored in the storage device 140 when the computer system 100 executes the boot procedure. However, the scope of the present invention is not restricted by the foregoing embodiment. Another embodiment is to be illustrated below for further exemplifying the spirit of the present invention.

Figure 3A:
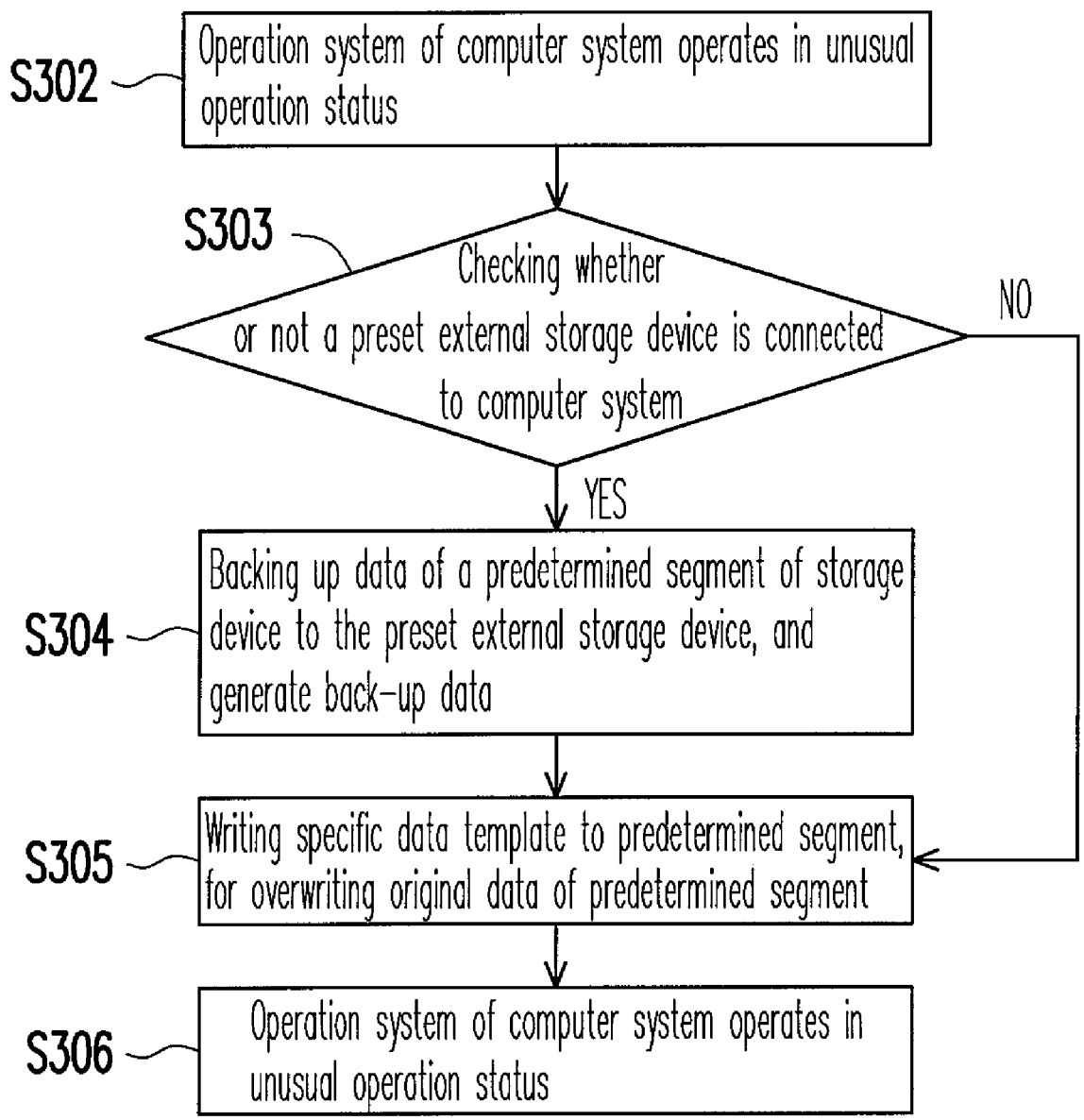
FIGS. 3A and 3B show a flow chart illustrating a method for protecting data according to another embodiment of the present invention.
Figure 3B:
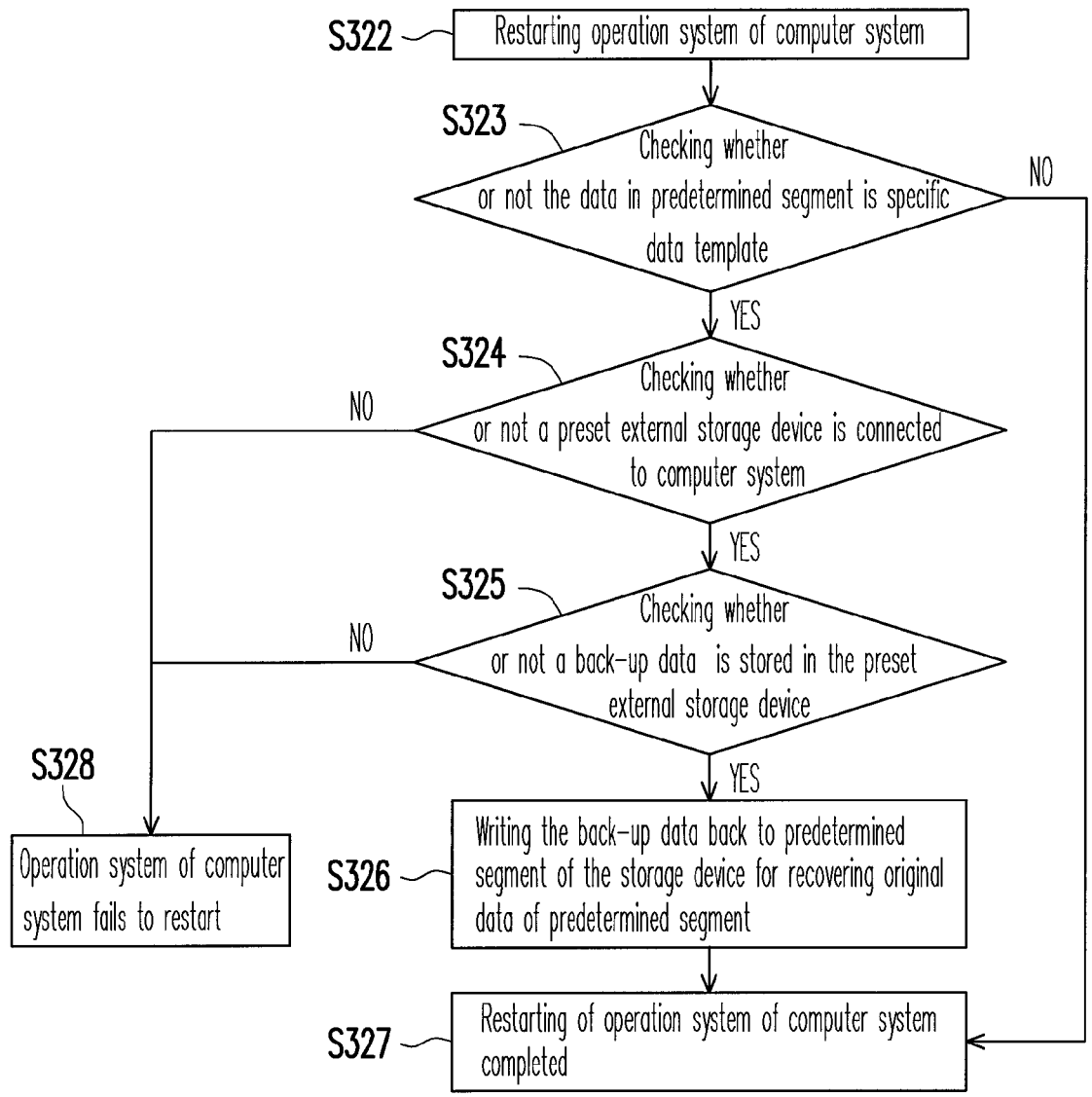

FIGS. 3A and 3B show a flow chart illustrating a method for protecting data according to another embodiment of the present invention. Referring to FIGS. 1 and 3A, being different from the foregoing, the current embodiment provides a method for protecting data can be realized with an application program. When a user enables the method for protecting data from an operation system of the computer system, the operation system of the computer system 100 enters step S302. At step S302, when the computer system enters an unusual operation status, an application program installed in the computer system 100 executes step S303, to check whether or not the preset external storage device 170 is connected to the computer system 100.

In the current embodiment, the unusual operation status can be a sleeping status, a power saving status, or a user logging out status. Further, in other embodiments, the application program determines whether the preset external storage device 170 is connected to the computer device or not by inspecting a status of a preset flag.

Further, the process of determining whether the preset external storage device 170 is connected to the computer device or not can be learnt by referring to the foregoing embodiment, and steps S304, S305 are same or similar to steps S204, S205 of FIG. 2a, respectively, and thus are not to be iterated hereby. Finally, at step S306, the computer system 100 continues to execute the corresponding operation under the unusual operation status. In such a way, the current embodiment provides protection to data stored in the storage device 140.

Referring to FIG. 3B, being different from the embodiment of FIG. 2B, the current embodiment provides a method for protecting data can be realized with an application program. FIG. 3B and FIG. 2B are different in that: the method for protecting data of FIG. 2B is executed when the computer system 100 executes a boot procedure, while the method for protecting data of FIG. 3B is executed when restarting the operation system of the computer system 100.

Further, steps S223, S224, S225 are inspection operations executed by the computer system 100 with the codes of the BIOS unit 150, while steps S232, S324, S325 are inspection operations executed by the computer system 100 when executing other application programs. As such, the method of FIG. 3B is similar to FIG. 2B, and thus can be learnt by referring to the discussion of the FIG. 2B, and therefore is not to be iterated hereby.

Further referring to FIG. 3B, at step S323, because the application program installed in the computer system 100 checks that the data of the MBR sector of the storage device 140 has been overwritten by the specific data template, when executing steps S324 and S325, the results obtained are all "NO", and therefore, the method is directly directed to step S328, in which it is determined that the operation system of the computer system 100 is incapable of recovering the usual operation status by the original data of the storage device 140.

Figure 4A:
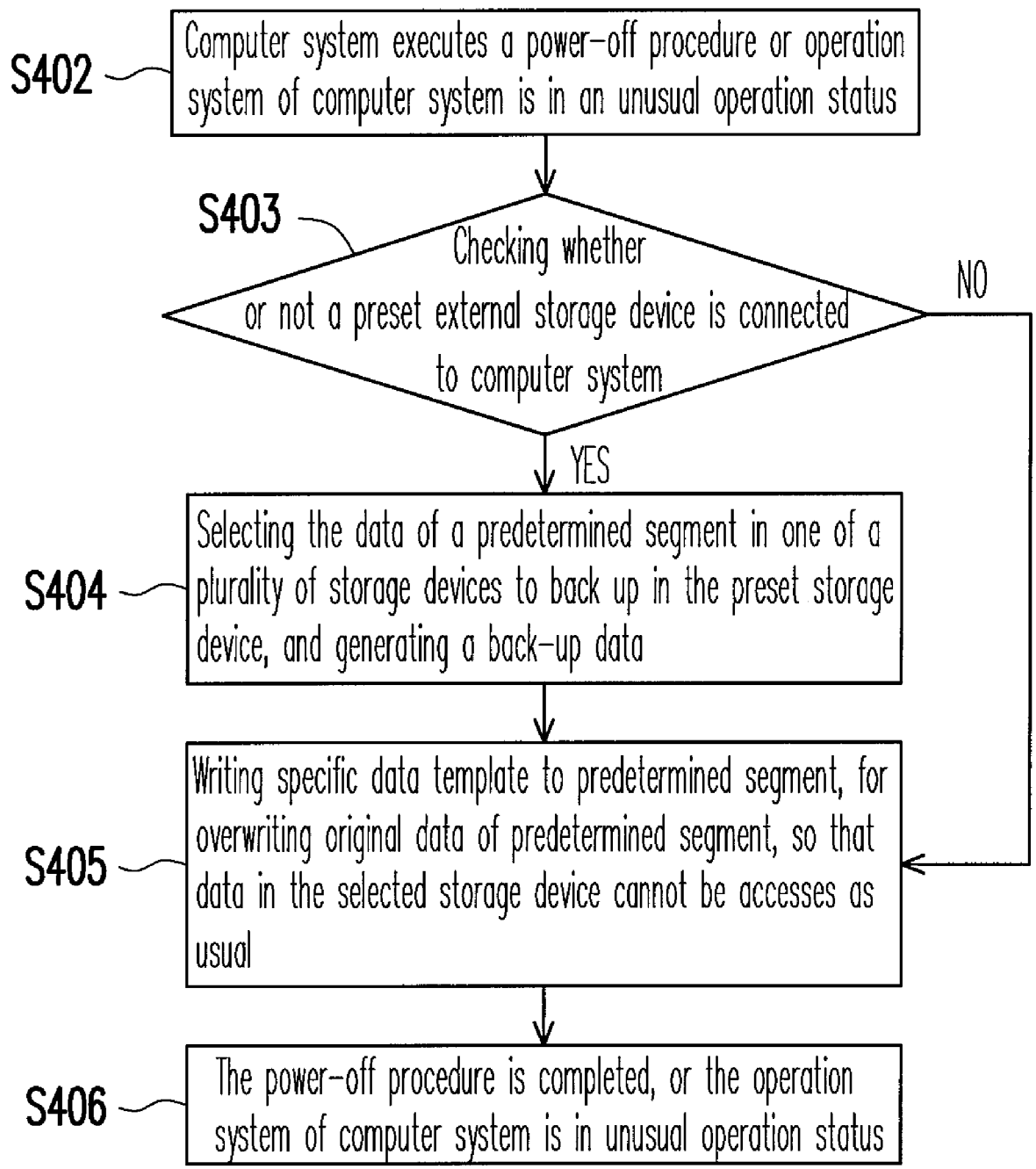
FIGS. 4A and 4B show a flow chart illustrating a method for managing an access authority for a storage device according to another embodiment of the present invention.
Figure 4B:
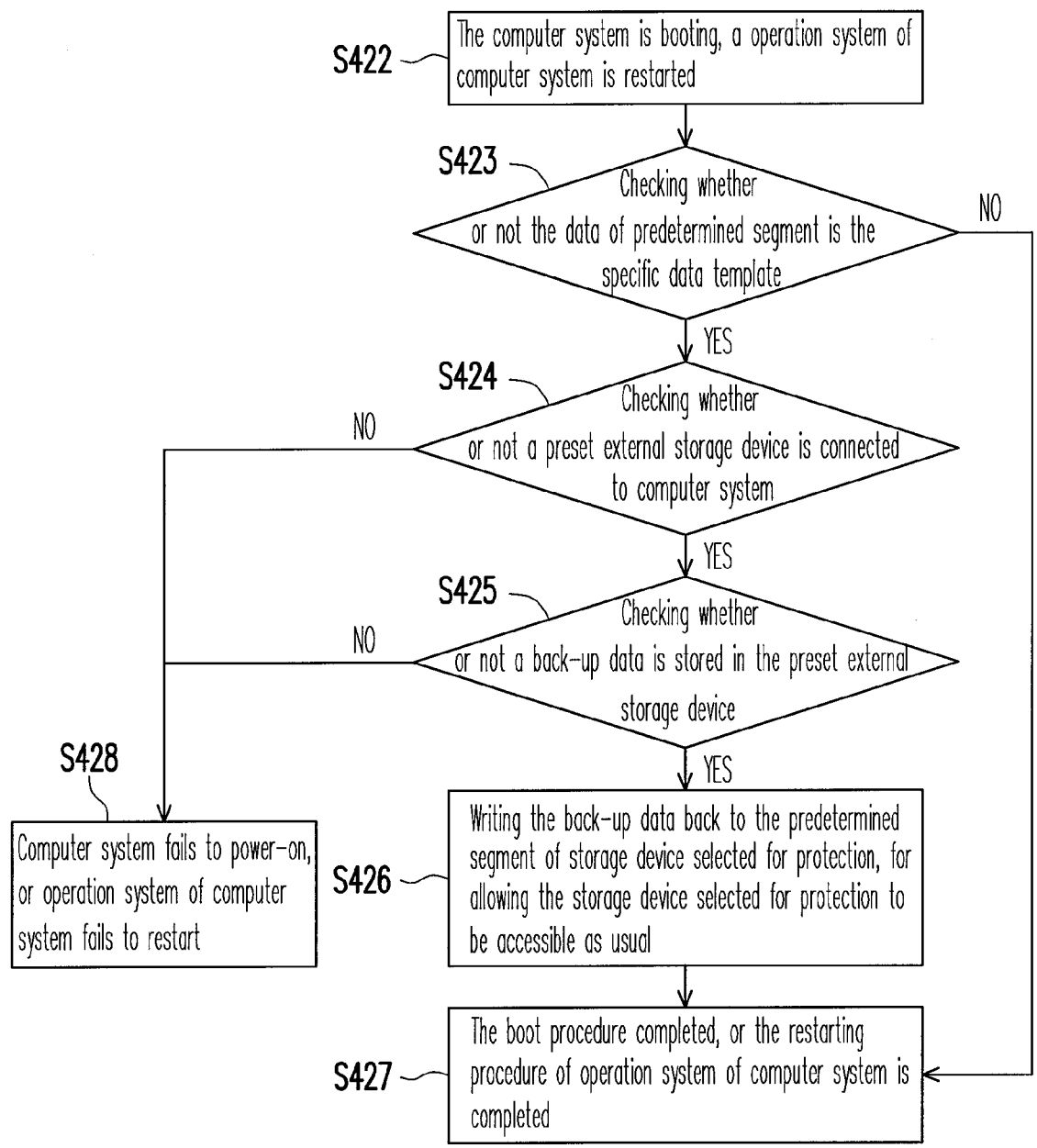
Figure 5:
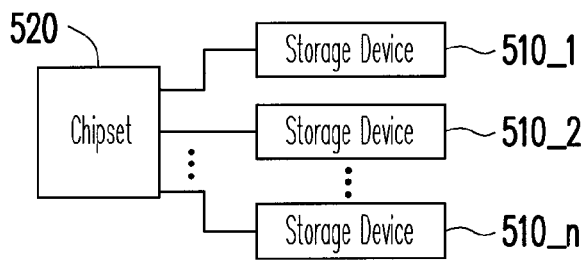
FIG. 5 is a block diagram illustrating a partial structure of another computer system according to an embodiment of the present invention.

It can be learnt from the foregoing embodiments that the present invention provides a method for protecting data. Further, when applying the foregoing embodiments, a method for managing an access authority for a storage device can be obtained as shown in FIGS. 4A and 4B. The flow of the method for managing an access authority can be learnt by referring to the embodiments of FIGS. 2A, 2B, and 3A, 3B, and thus are to be iterated hereby. Further, the method for managing an access authority is further adapted for managing a computer system 500 including a plurality of storage devices, as shown in FIG. 5. Referring to FIGS. 4 and 5, the computer system 500 provided in the current embodiment includes a plurality of storage devices 510_1, 510_2, ..., 510_n, all of which being connected to a chipset 520.

Supposing that the computer system 500 is adapted for the method for protecting data as shown in FIGS. 2A, 2B, 3A, and 3B, a user A enables the foregoing method for protecting data when using the computer system 500, in which the user A enables the storage device 510_1 to operate the computer system 500.

When the computer system 500 is being powered off, or other operation systems are in unusual operation statuses (i.e., sleeping status, power saving status, or user logging out status), it is preferred to back up data of a predetermined segment of the storage device 510_1 to a preset external storage device NO.1, corresponding to the flow of data protection shown in FIG. 2A or FIG. 3A. After backing up the data, a specific data template is written into the predetermined segment of the storage device 510_1, for protecting the data stored in the storage device 510_1.

However, when an unauthorized user B comes to use the computer system 500, he may try to use the storage device 500_1 to power on the computer system 500, or recover the computer system 500 to a usual operation status. When the computer system 500 enters the boot procedure or restarting the operation system of the computer system 500, it might be found that the preset storage device is not connected to the computer system 500, so that the computer system 500 is incapable of completing the boot procedure or recovering the operation system to the usual operation status by the original data of the predetermined segment of the storage device 510_1.

When using the computer system 500, the user B may have previously connected another preset external storage device NO.2 to the computer system 500, and then tries to use the storage device 500_1 to power on the computer system 500, or recover the computer system 500 to a usual operation status. Although, in this case, the computer system will find that the preset external storage device NO.2 is connected to the computer system 500, such the original data of the predetermined segment of the storage device 510_1 is not stored in a preset external storage device NO.2, and therefore, the computer system 500 is still incapable of completing the boot procedure or recovering the operation system to the usual operation status by the original data of the predetermined segment of the storage device 510_1.

Further, the storage devices 510_2 through 510_n are not provided with data protection, and therefore the user B can select data stored in one of the storage devices 510_2 through 510_n for powering on the computer system 500, or recovering the operation system of the computer system 500 to the usual operation status. However, even though the user B can normally operate the computer system 500, because the data stored in the storage device 510_1 is being protected, the user B is still incapable of access the storage device 510_1.

If the user B selects the storage device 510_2 for accessing data, and if he similarly enables the foregoing method for protecting data after accessing the data, when the computer system 500 executes a power-off procedure, or the operation system of the computer system 500 is in an unusual operation status, the computer system 500 can also back up data of a predetermined segment of the storage device 510_2 to the preset external storage device NO.2. After backing up the data, a specific data template is written into the predetermined segment of the storage device 510_2, for protecting the data stored in the storage device 510_2.

Then, when the user A operates the computer system 500 again, he is allowed to complete the boot procedure or recover the operation system of the computer system 500 to the usual operation status, by the preset external storage device NO.1, in which the preset external storage device NO.1 contains data of the predetermined segment of the storage device 510_1.

After completing the boot procedure or recovering the operation system to the usual operation status of the computer system 500, the user A can use the hard drive 510_1 for data access, and can also use the storage devices 510_3 through 510_n. However, because the data stored in the storage devices 510_2 has already been protected, the user A is not authorized to access the storage device 510_2. As such, before being recovered back to the original data, those protected storage device cannot be accessed by unauthorized users, for providing better data protection.

In summary, the present invention employs a preset external storage device for backing up data of a predetermined segment of a storage device, and further employs a specific data template for covering original data of the foregoing predetermined segment, so as to provide protection to the data stored in the storage device. Before recovering data of the predetermined segment back to the original data, the data stored in the predetermined segment is still the specific data template, so that the computer system is incapable of normally accessing the data stored in the predetermined segment of the storage device. As such, the present invention is adapted for effectively protecting data stored in the storage device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for protecting data, adapted for a computer system having a storage device, the method comprising:
    checking whether or not a preset external storage device is connected to the computer system, when the computer system executes a power-off procedure; and
    backing up data of a predetermined segment of the storage device to the preset external storage device, and generating a back-up data, and then writing a specific data template to the predetermined segment for covering original data of the predetermined segment, when the preset external storage device is connected to the computer system as the power-off procedure of the computer system being executed.

2. The method for protecting data according to claim 1, further comprising:
    checking whether or not the data in the predetermined segment is the specific data template, when the computer system is booting;
    checking whether or not the preset external storage device is connected to the computer system, when the data in the predetermined segment is the specific data template;
    checking whether or not the back-up data is stored in the preset external storage device connected to the computer, when the computer system is booting, and the data in the predetermined segment is the specific data template; and
    writing the back-up data back to the predetermined segment, when the back-up data is stored in the preset external storage device.

3. The method for protecting data according to claim 1, wherein the preset external storage device is a non-volatile storage device.

4. The method for protecting data according to claim 1, wherein the preset external storage device is connected to the computer system via a connecting interface.

5. The method for protecting data according to claim 1, wherein the predetermined segment is a master boot recorder (MBR) sector.

6. A method for protecting data, adapted for a computer system having a storage device, the method comprising:
    checking whether or not a preset external storage device is connected to the computer system, when the computer system is operated in an unusual operation status; and
    backing up data of a predetermined segment of the storage device to the preset external storage device, and generating a back-up data, when the preset external storage device is connected to the computer system as the computer system being operated in an unusual operation status, and then writing a specific data template to the predetermined segment for covering original data of the predetermined segment.

7. The method for protecting data according to claim 6, further comprising:
   checking whether or not the data in the predetermined segment is the specific data template, when the computer system is restarted;
   checking whether or not the preset external storage device is connected to the computer system, when the data in the predetermined segment is the specific data template;
   checking whether or not the back-up data is stored in the preset external storage device connected to the computer system, when the data in the predetermined segment is the specific data template, and the computer system is restarted; and
   writing the back-up data back to the predetermined segment for recovering the original data of the predetermined segment, when the back-up data is stored in the preset external storage device.

8. The method for protecting data according to claim 6, wherein the unusual operation status is a sleeping status, a power saving status, or a user logging out status.

9. The method for protecting data according to claim 6, wherein the preset external storage device is a non-volatile storage device.

10. The method for protecting data according to claim 6, wherein the preset external storage device is connected to the computer system via a connecting interface.

11. The method for protecting data according to claim 6, wherein the predetermined segment is a master boot recorder (MBR) sector.

12. A method for managing an access authority for a storage device, adapted for managing a computer system having a plurality of storage devices, the method comprising:
    checking whether or not a preset external storage device is connected to the computer system, when the computer system is either being executed with a power-off procedure, or being operated in an unusual operation status;
    selecting data in a predetermined segment of one of the storage devices to back up to the preset external storage device, and generating a back-up data, when the preset external storage device is connected to the computer system, and then writing specific data template to the predetermined segment for covering the data in the predetermined segment, so that the data stored in the selected storage device cannot be accessed normally.

13. The method according to claim 12, further comprising:
    checking whether or not the data in the predetermined segment is the specific data template, when the computer system is booting or the operation system is restarted of the computer system;
    checking whether or not the preset external storage device is connected to the computer system, when the data in the predetermined segment is the specific data template;
    checking whether or not the back-up data is stored in the preset external storage device connected to the computer system, when the computer system is booting and the data in the predetermined segment is the specific data template; and
    writing the back-up data back to the predetermined segment of the storage device selected for protection, when the back-up data is stored in the preset external storage device, so as for allowing the storage device selected for protection to be normally accessed.

14. The method according to claim 12, wherein checking whether or not the preset external storage device is connected to the computer system is inspecting a status of a preset flag by the computer system.

15. The method according to claim 12, wherein the unusual operation status is a sleeping status, a power saving status, or a user logging out status.

16. The method according to claim 12, wherein the predetermined segment is a master boot recorder (MBR) sector.

* * * * *